(12) United States Patent
Chae et al.

(10) Patent No.: US 9,888,427 B2
(45) Date of Patent: Feb. 6, 2018

(54) METHOD AND APPARATUS FOR TRANSCEIVING SIGNAL IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Hyukjin Chae, Seoul (KR); Byoung-Yoon Min, Seoul (KR); Kiyeon Kim, Seoul (KR); Dong Ku Kim, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 36 days.

(21) Appl. No.: 15/034,694

(22) PCT Filed: Dec. 5, 2014

(86) PCT No.: PCT/KR2014/011928
§ 371 (c)(1),
(2) Date: May 5, 2016

(87) PCT Pub. No.: WO2015/084105
PCT Pub. Date: Jun. 11, 2015

(65) Prior Publication Data
US 2016/0277995 A1    Sep. 22, 2016

Related U.S. Application Data

(60) Provisional application No. 61/912,533, filed on Dec. 5, 2013.

(51) Int. Cl.
*H04W 40/12* (2009.01)
*H04B 7/022* (2017.01)
*H04L 5/00* (2006.01)

(52) U.S. Cl.
CPC ............ *H04W 40/12* (2013.01); *H04B 7/022* (2013.01); *H04L 5/0023* (2013.01); *H04L 5/0091* (2013.01)

(58) Field of Classification Search
None
See application file for complete search history.

(56) References Cited

U.S. PATENT DOCUMENTS 9,276,787 B2 * 3/2016 Bhattad ................. H04L 5/0053
9,363,780 B2 * 6/2016 Yang ..................... H04W 52/34
(Continued)

FOREIGN PATENT DOCUMENTS

KR    10-2010-0082284 A    7/2010
KR    10-2011-0051581 A    5/2011

OTHER PUBLICATIONS

Chalise et al., "Mimo Relaying for Multi-Point to Multi-Point Communication in Wireless Networks," In: Computational Advances in Multi-Sensor Adaptive Processing, 2007, 2nd IEEE International Workshop, Dec. 12-14, 2007, pp. 217-220.

*Primary Examiner* — Hong Cho
(74) *Attorney, Agent, or Firm* — Birch, Stewart, Kolasch & Birch, LLP

(57) ABSTRACT

One embodiment of the present invention relates to a method for a first base station transmitting a signal in a wireless communication system, the method comprising the steps of: the first base station receiving channel information from a first terminal belonging to the first base station and a second terminal belonging to a second base station; and transmitting a signal for the first station to at least one terminal from among the first terminal and the second (Continued)

terminal by considering the channel information, wherein if the signal to interference plus noise ratio (SINR) according to the channel information is equal to or higher than a predetermined value, then the signal for the first base station is transmitted to the second signal.

12 Claims, 8 Drawing Sheets

(56) References Cited

U.S. PATENT DOCUMENTS

| | | |
|---|---|---|
| 2012/0093010 A1 | 4/2012 | Vajapeyam et al. |
| 2012/0189037 A1 | 7/2012 | Seo et al. |
| 2012/0300666 A1 | 11/2012 | Jang et al. |
| 2014/0370931 A1 | 12/2014 | Yang et al. |

* cited by examiner

FIG. 5
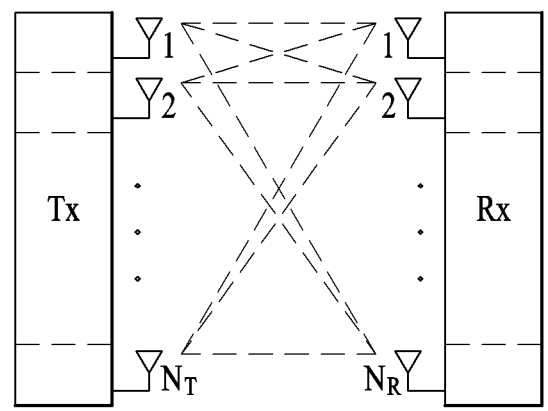
(a)
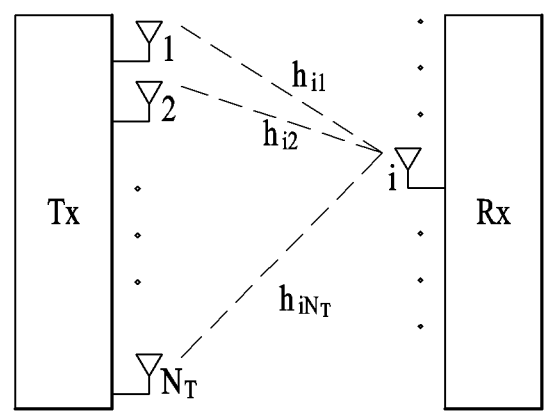
(b)

METHOD AND APPARATUS FOR TRANSCEIVING SIGNAL IN WIRELESS COMMUNICATION SYSTEM

CROSS REFERENCE TO RELATED APPLICATIONS

This application is the National Phase of PCT International Application No. PCT/KR2014/011928, filed on Dec. 5, 2014, which claims priority under 35 U.S.C. 119(e) to U.S. Provisional Application No. 61/912,533, filed on Dec. 5, 2013, all of which are hereby expressly incorporated by reference into the present application.

TECHNICAL FIELD

The following description relates to a wireless communication system, and more particularly, to a method of transceiving a two-way coding applied signal and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to provide a method of transceiving a signal to which two-way coding and detouring path are applied.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of transmitting a signal transmitted by a first base station in a wireless communication system, including the steps of receiving channel information from a first user equipment belonging to the first base station and a second user equipment belonging to a second base station and transmitting the signal for the first base station to at least one of the first user equipment and the second user equipment in consideration of the channel information, wherein if SINR (signal to interference plus noise ratio) according to the channel information is equal to or greater than a preset value, the signal for the first base station is transmitted to the second user equipment.

In a second technical aspect of the present invention, provided herein is a first base station device in transmitting a signal in a wireless communication system, including a transmitting module and a processor configured to receive channel information from a first user equipment belonging to the first base station and a second user equipment belonging to a second base station and transmit the signal for the first base station to at least one of the first user equipment and the second user equipment in consideration of the channel information, wherein if SINR (signal to interference plus noise ratio) according to the channel information is equal to or greater than a preset value, the processor is further configured to transmit the signal for the first base station to the second user equipment.

The following matters may be included in the first and second technical aspects of the present invention.

The signal transmitted to the second user equipment may be transmitted to the second base station and the signal transmitted to the second base station may be transmitted to the first user equipment.

A channel between the first base station and the second user equipment, a channel between the second user equipment and the second base station and a channel between the second base station and the first user equipment may be causal.

If a channel variation between the first user equipment and the first base station is equal to or greater than a preset value, the signal for the first base station may be transmitted to the second user equipment.

If mobility of the first user equipment is equal to or greater than a preset value, the signal for the first base station may be transmitted to the second user equipment.

The channel information may be created in consideration of two-way coding.

If the SINR according to the channel information is equal to or greater than the preset value, the signal for the first base station may be transmitted to each of the first user equipment and the second user equipment.

The signal transmitted to the first user equipment and the signal transmitted to the second user equipment may be transmitted to the second base station and the signal transmitted to the second base station may be transmitted to the first user equipment.

The signal transmitted to the first user equipment and the signal transmitted to the second user equipment may be combined in the second base station.

The signal transmitted to the first user equipment and the signal transmitted to the second user equipment may be transmitted to the first base station and the second base station, respectively and each of the first base station and the second base station may combine the signals received from the respective user equipments and then transmits the combined signal to the first user equipment.

If the SINR according to the channel information is smaller than the preset value, the signal for the first base station may be transmitted in a single hop.

Advantageous Effects

According to the present invention, a base station can perform transmission and reception by maximizing a gain of two-way coding using multi-antenna transmission and reception.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram to describe MIMO.

BEST MODE FOR INVENTION

Figure 1:
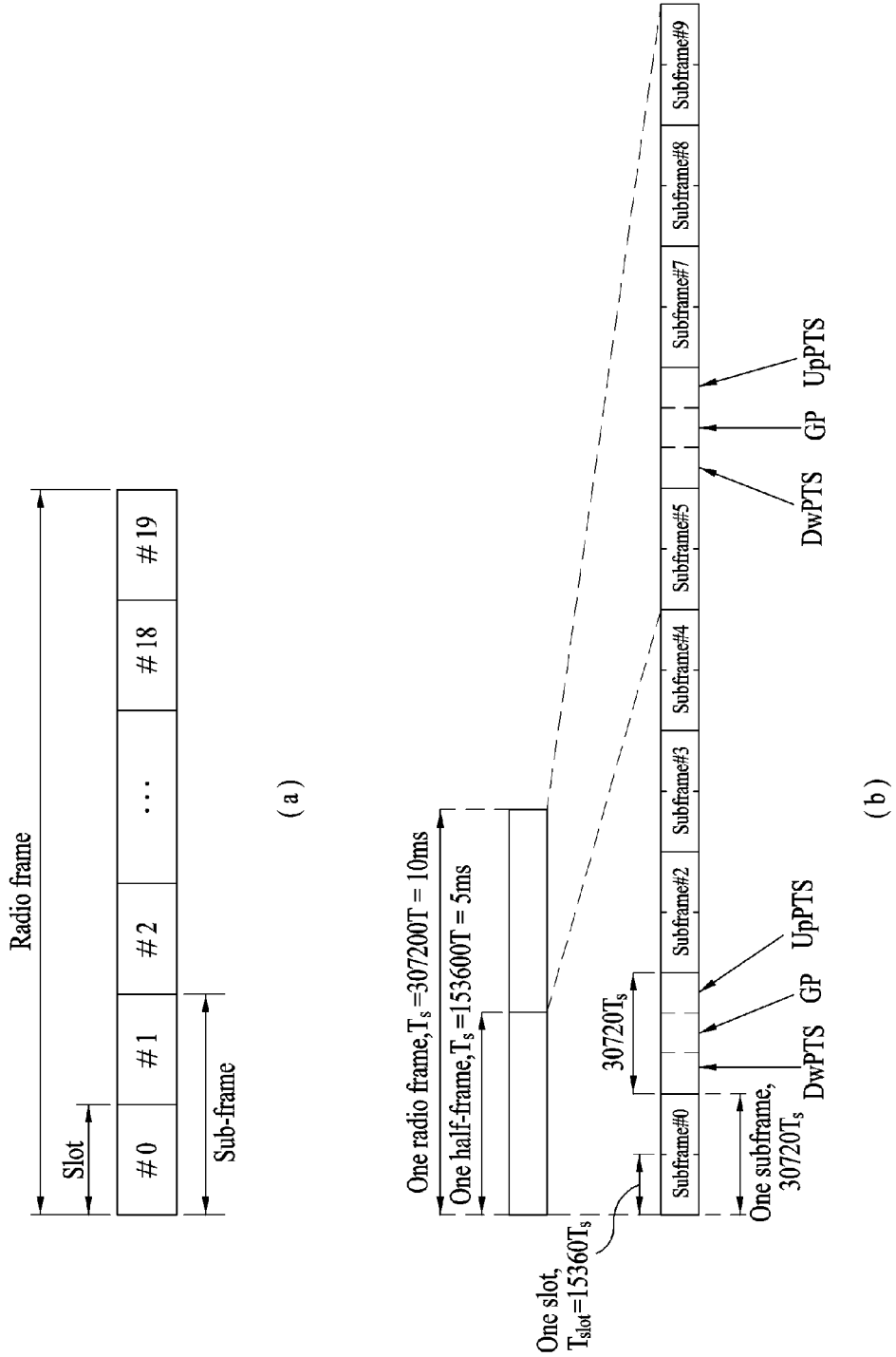
FIG. 1 is a diagram to show a structure of a radio frame.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

A name of a cell described in the following is applied to a transceiving point such as a base station (eNB), a sector, a remote radio head (RRH), a relay, or the like, and may be used as an inclusive terminology for distinguishing a component carrier at a specific transceiving point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (U IRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

LTE/LTE-A Resource Structure/Channel

A downlink radio frame structure will now be described with reference to FIG. 1.

In a cellular OFDM radio packet communication system, uplink/downlink data packet transmission is performed subframe by subframe. A subframe is defined as a predetermined time interval including a plurality of OFDM symbols. 3GPP LTE standard supports type 1 radio frame structure applicable to frequency division duplex (FDD) and type 2 radio frame structure applicable to time division duplex (TDD).

FIG. 1(a) shows the type 1 radio frame structure. A downlink radio frame is divided into 10 subframes. Each subframe is further divided into two slots in the time domain. A unit time during which one subframe is transmitted is defined as Transmission Time Interval (TTI). For example, one subframe may be lms in duration and one slot may be 0.5 ms in duration. A slot may include a plurality of OFDM symbols in the time domain and include a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce inter-symbol interference.

In case of a normal CP, since one slot includes seven OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. DwPTS is used to perform initial cell search, synchronization, or channel estimation. UpPTS is used to perform channel estimation of a base station and uplink transmission synchronization of a UE. The guard interval (GP) is located between an uplink and a downlink so as to remove interference generated in the uplink due to multi-path delay of a downlink signal. One subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
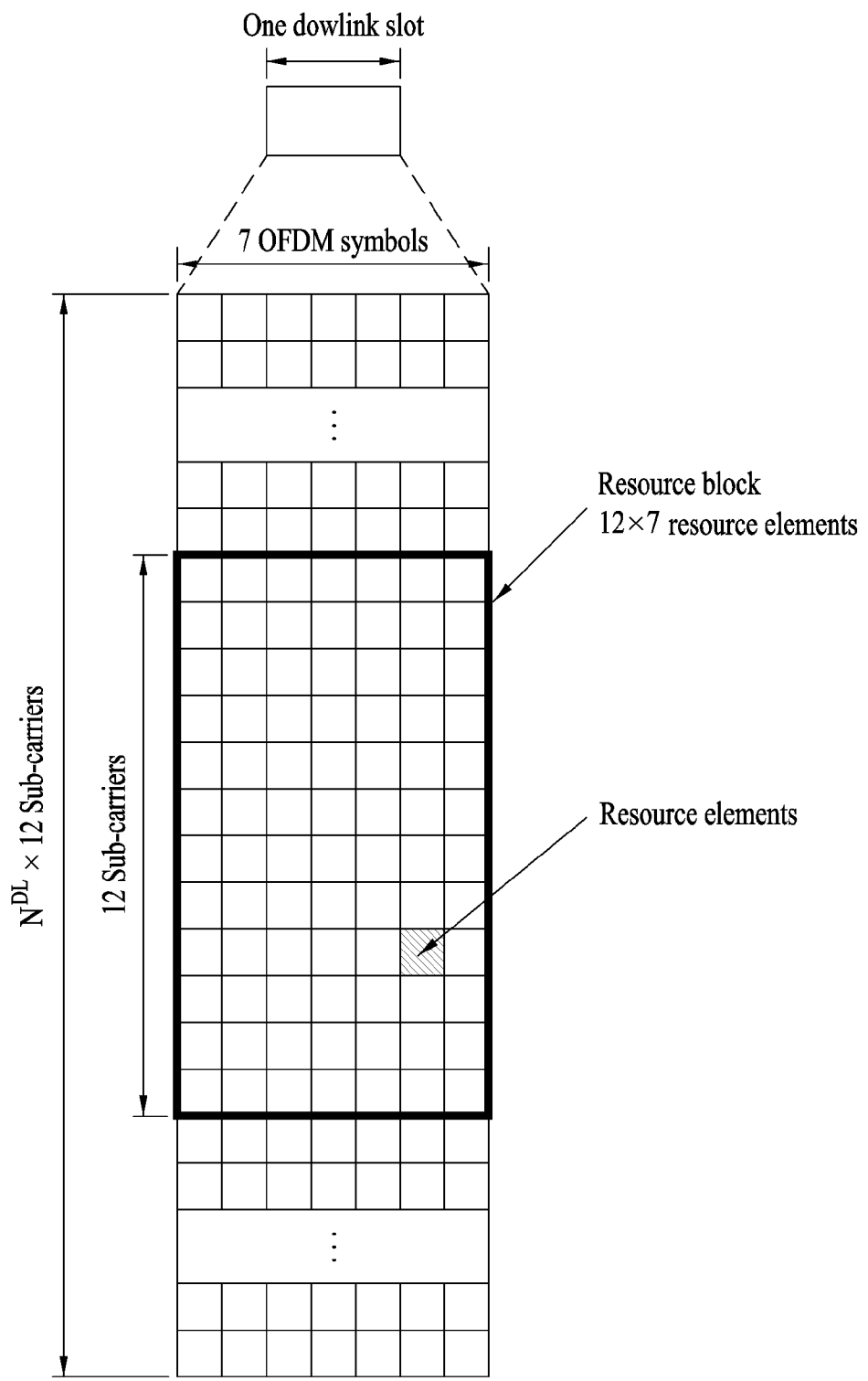
FIG. 2 is a diagram to show a resource grid in a downlink slot.

FIG. 2 is a diagram showing a resource grid in a downlink slot. Although one downlink slot includes seven OFDM symbols in the time domain and one RB includes 12 subcarriers in the frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
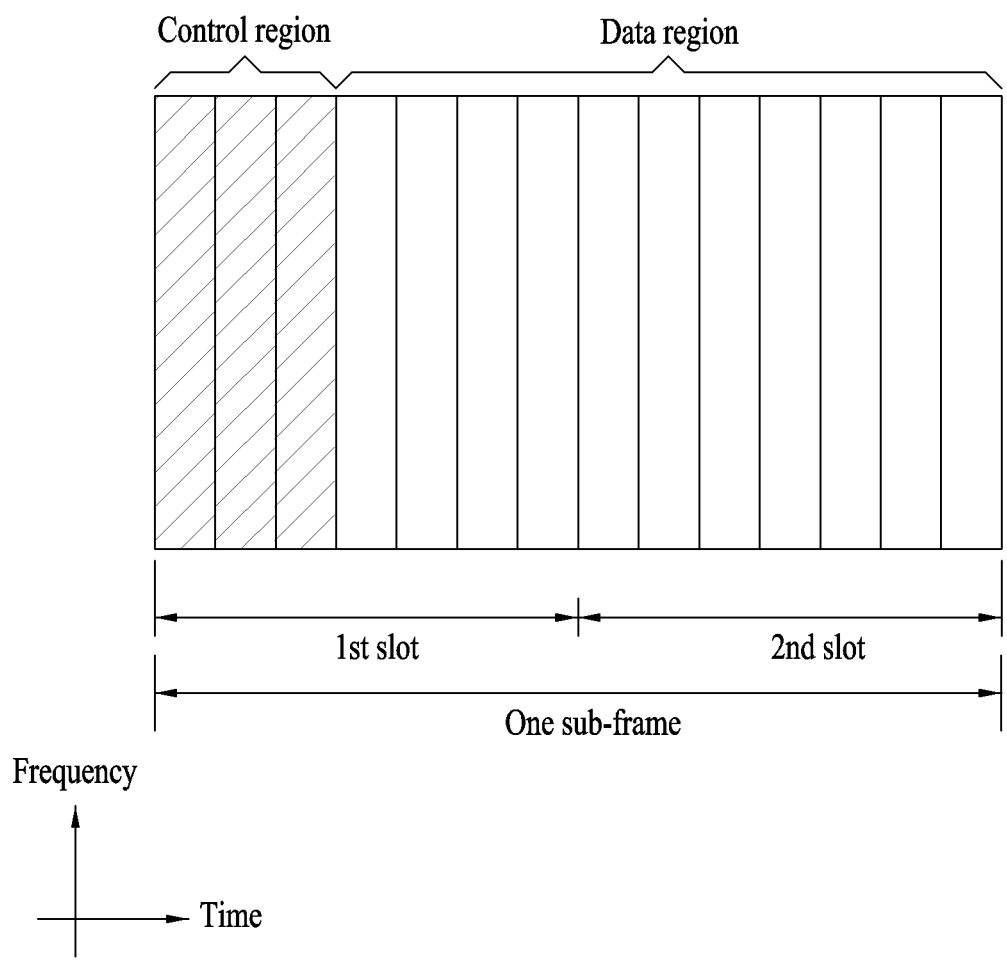
FIG. 3 is a diagram to show a structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACKNACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
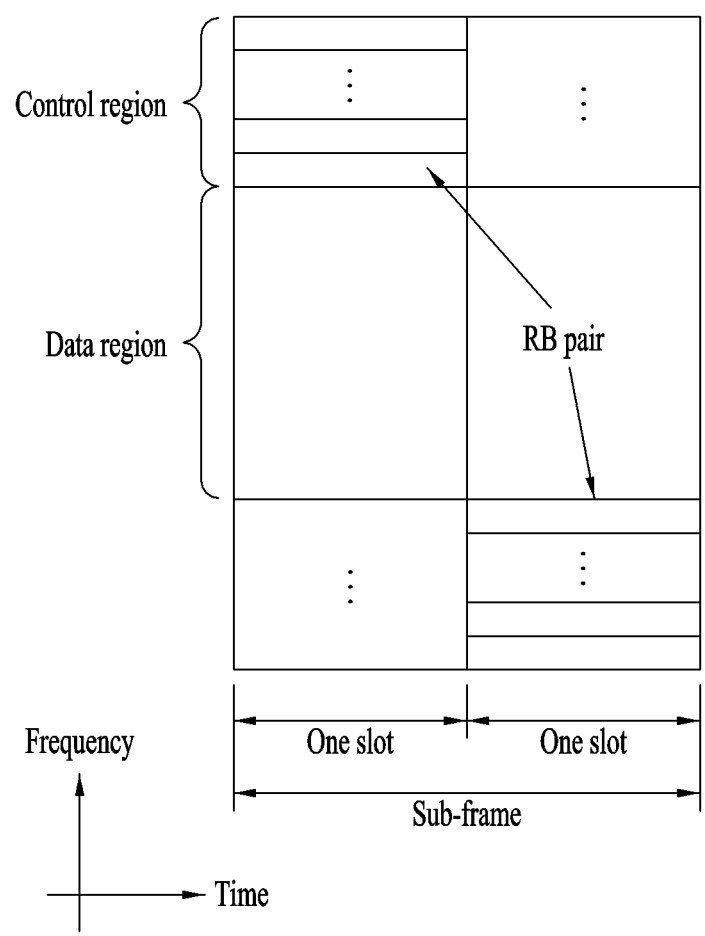
FIG. 4 is a diagram to show a structure of an uplink subframe.
Figure 6:
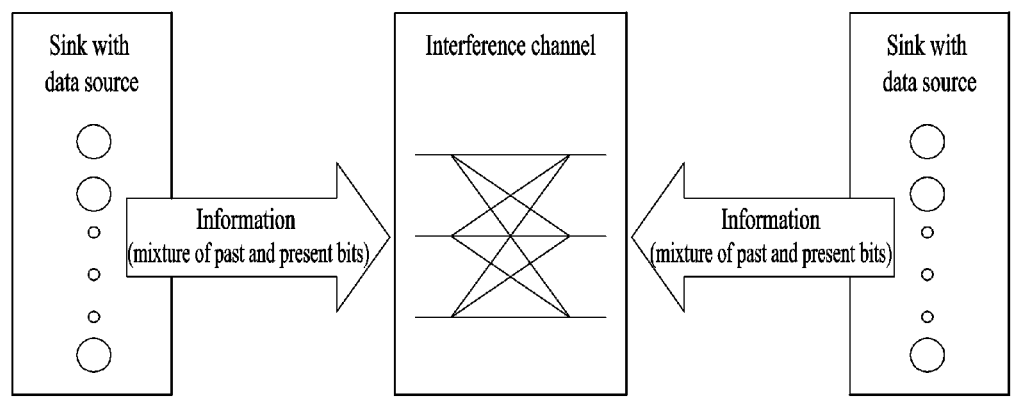
FIG. 6 is a diagram to show a two-way interference channel.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is frequency-hopped at a slot edge.

FIG. 5 is a schematic view illustrating a wireless communication system provided with multiple antennas.

As shown in FIG. 5(a), if the number of transmitting antennas increases to $N_T$ and the number of receiving antennas increases to $N_R$, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate based on increase of channel transmission capacity may increase theoretically as much as a value obtained by multiplying a maximum transmission rate $R_0$, which corresponds to a case where a single antenna is used, by an increase rate $R_i$, as follows.

$$R_i = \min(N_T, N_R) \qquad \text{[Equation 1]}$$

For example, in a MIMO communication system that uses four transmitting antennas and four receiving antennas, a transmission rate theoretically four times greater than that of a single antenna system may be obtained.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \qquad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{s}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

It is considered that a weight matrix W is applied to the information vector $\hat{s}$ of which transmission power is controlled, so as to obtain NT transmitting signals $x_1, x_2, \ldots, x_{N_T}$. In this case, the weight matrix W serves to properly distribute the transmission information to each antenna in accordance with the transmission channel status. Such transmitting signals $x_1, x_2, \ldots, x_{N_T}$ may be expressed as follows using a vector X.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In this case, $W_{ij}$ means a weight value between the ith transmitting antenna and the jth information. W may be referred to as a precoding matrix.

If there exist NR receiving antennas, receiving signals $y_1, y_2, \ldots, y_{N_R}$ of the respective antennas may be expressed by a vector as follows.

$$y = [y_1, y_2, \ldots, y_{N_R}]^T$$

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

FIG. 5(b) illustrates channels from $N_T$ transmitting antennas from the receiving antenna i. Several channels may be grouped into one and then may be expressed by a vector type or a matrix type. As shown in FIG. 5(b), the channels from $N_T$ transmitting antennas to the ith receiving antenna may be expressed as follows.

$$h_i^T = [h_{i1}, h_{i2}, \ldots, h_{iN_T}] \qquad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

Additive white Gaussian noise (AWGN) is actually added to the channels after the above channel matrix H. AWGN $n_1, n_2, \ldots, n_{N_R}$ added to each of the NR receiving antennas may be expressed as follows.

$$n = [n_1, n_2, \ldots, n_{N_R}]^T \qquad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \qquad \text{[Equation 10]}$$

$$\begin{bmatrix} n_1 \\ n_2 \\ \vdots \\ n_i \\ \vdots \\ n_{N_R} \end{bmatrix} = Hx + n$$

In the mean time, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \qquad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that can transmit different kinds of information from a given channel.

Channel State Information (CSI) Feedback

MIMO system may be classified into an open-loop system or a closed-loop system. The open-loop system may mean that a transmitting stage performs MIMO transmission without feedback of channel state information from MIMO receiving stage. The closed-loop system may mean that a transmitting stage performs MIMO transmission with feedback of channel state information from MIMO receiving stage. According to the closed-loop MIMO system, each of the transmitting stage and the receiving stage may be able to perform beamforming based on the channel state information to obtain a multiplexing gain of MIMO transmitting antennas. In order for the receiving stage (e.g., user equipment) to feed back channel state information, the transmitting stage (e.g., base station) may be able to allocate a UL control channel or a UL shared channel to the receiving stage (e.g., user equipment).

Meanwhile, the fed-back CSI may include a rank indicator (RI), a precoding matrix index (PMI) and a channel quality indicator (CQI).

The RI is the information on a channel rank. A rank of a channel may mean a maximum number of layers (or streams) capable of carrying different informations via the same time-frequency resource. Since a rank value is mainly determined by long-term fading of a channel, it may be generally fed back in a cycle longer than that of the PMI or the CQI (i.e., less frequently).

The PMI is the information on a precoding matrix used for transmission from a transmitting stage. Precoding means that a transmission layer is mapped to a transmitting antenna. By the precoding matrix, layer-to-antenna mapping relation may be determined. The PMI corresponds to a precoding matrix index of a base station preferred by a user equipment with reference to such a metric as a signal-to-interference plus noise ratio (hereinafter abbreviated SINR) and the like. In order to reduce feedback overhead of precoding information, a transmitting stage and a receiving stage share a codebook containing various precoding matrixes with each other in advance and an index indicating a specific precoding matrix in the corresponding codebook may be fed back only.

A system (e.g., LTE-A system) that supports an extended antenna configuration considers obtaining additional multiuser diversity using multiuser-MIMO (MU-MIMO) scheme. Since an interference channel between user equipments multiplexed in antenna domain exists in the MU-MIMO scheme, when a base station performs a DL transmission using channel state information fed back by one user equipment among multiple users, it may be necessary to prevent interference from occurring on other user equipments. Hence, in order to correctly perform MU-MIMO operation, it may be necessary to feed back the CSI having accuracy higher than that of a single user-MIMO (SU-MIMO) scheme.

Thus, in order to measure and repot more accurate CSI, a new CSI feedback scheme of improving the previous CSI including RI, PMI and CQI may apply. For instance, precoding information fed back by a receiving stage may be indicated by a combination of 2 PMIs. One (i.e., $1^{st}$ PMI) of the 2 PMIs has the attribute of long term and/or wideband and may be named W1. And, the other one (i.e., $2^{nd}$ PMI) of the 2 PMIs has the attribute of short term and/or subband and may be named W2. And, a final PMI may be determined by a combination (or function) of W1 and W2. For instance, if a final PMI is set to W, it may define 'W=W1*W2' or 'W=W2*W1'.

The CQI is the information indicating a channel quality or a channel strength. The CQI may be represented as a predetermined MCS combination. In particular, a fed-back CQI index indicates a corresponding modulation scheme and a corresponding code rate. Generally, the CQI becomes a value that reflects a reception SINR obtainable in case that a base station configures a spatial channel using PMI.

The CSI feedback scheme is classified into a periodic reporting through PUCCH corresponding to an uplink control channel and an aperiodic reporting through PUSCH corresponding to an uplink data channel in response to a request made by a base station.

Two-Way Coding Transceiving Scheme

In the following, based on the foregoing description, a transceiving scheme by utilizing multi-antenna transceiving, two-way coding and the like is described. The two-way coding is a scheme of increasing capacity by obtaining a temporal diversity gain of a channel in a manner of sending information through a detouring path that uses both a forward channel and a backward channel. Details of the two-way coding can refer to 'C. E. Shannon, "Two-way communication channels," in Proc. Of $4^{th}$ Berkeley Symp. Math. Stat. Prob., vol. 1, pp. 611-644, June 1961'. Regarding the two-way coding, the recent study of feedback teaches that considerable capacity increase is brought in an inter-user interference existing channel environment. And, the recent study (C. Suh, I-H. Wang and D. Tse, "Two-way interference channels," in Proc. Of 2012 IEEE Int. Symp. On Information Theory, vol. 1, pp. 2801-2805, July 2012)) of alleviating the assumption of a prefect information feedback premised in the study (G. Kramer, "Feedback strategies for white Gaussian interference networks," IEEE Trans. On Information Theory, vol. 48, pp. 1423-1438, June 2002 and C. Suh and D. Tse, "Feedback capacity of the Gaussian interference channel to within 2 bits," IEEE Trans. On Information Theory, vol. 57, pp. 2667-2685, May 2001, etc.) of clearing that a quantity of the increased capacity is not theoretically unlimited teaches that a channel capacity gain exists in a two-way interference channel.

Yet, the main study results of most of the two-way coding studies are considered in the deterministic model of SISO link (A. S. Avestimehr, S. N. Diggavi and D. N. C. Tse, "Wireless networks information flow: A deterministic approach," IEEE Trans. On Information Theory, vol. 57, PP. 1872-1950, April 2011.). Since the deterministic model assumes a simple demodulation in which a signal added in the course of transmission goes through XOR operation, it cannot be directly applied to a real model. For instance, the above study needs a substantial implementation of Hierarchical Encoding and SIC (successive interference cancellation) scheme. In this case, an extent of interference with a desired signal of a line between transmitting and receiving nodes approximates $Log_2(SNR)$ and $log_2(INR)$, it is actually used for hierarchical coding. Regarding the significance of the two-way coding, a two-way coding for a deterministic module does not need to assume a high SNR unlike interference alignment.

The crossing and connection of forward/backward transmission information through coding creates a number of transmission paths of data bits. For instance, in a two-user interference channel environment in which a transceiving pair $\{s_1, s_2, d_1, d_2\}$ of two persons exist, a data bit sent to $d_1$ by $s_1$ is transmitted through a path $(s_1 \rightarrow d_2 \rightarrow s_2 \rightarrow d_1)$ despite excluding an existing transmission path $(s_1 \rightarrow d_1)$.

Figure 7:
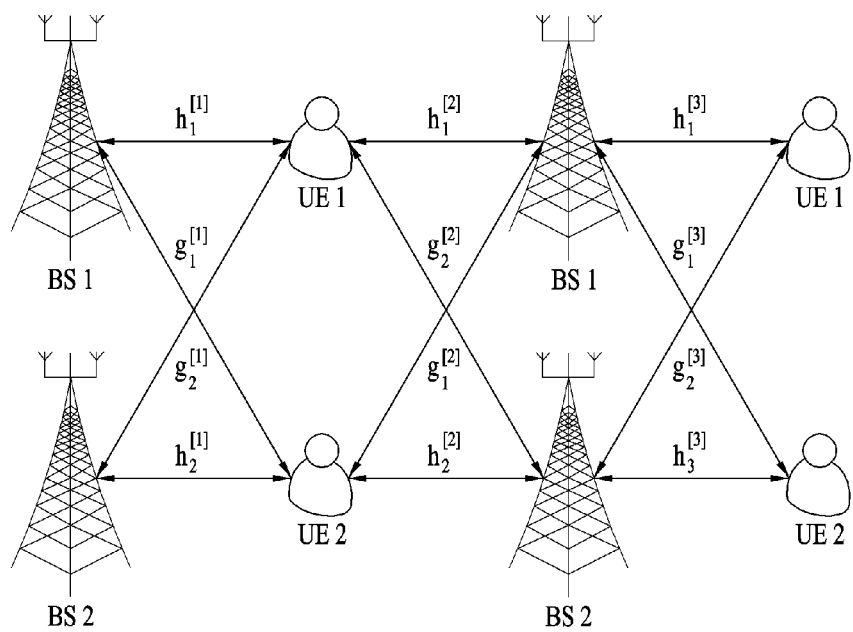
FIGS. 7 to 10 are diagrams to show embodiments of the present invention.

Moreover, in such a detouring path, when it is difficult to decode a current data affected by interference with a previously received data, it is able to use data retained by a corresponding party as side information. An optimization of such a data transmission path provides a gain to a total transmission rate owing to the two-way coding under a specific channel condition. An embodiment of the present invention premises such a system model as shown in FIG. 7. Yet, optimization of transmission path, two-way coding and feedback according to the present invention are non-limited by such a system model and can be applied to extension of more nodes and hop numbers from an embodiment disclosed in the present invention by those skilled in the art to which the present invention pertains.

FIG. 7 shows a first base station BS1 having Nt antennas, a second base station B2 having Nt antennas, two users (i.e., a first user equipment UE1 and a second user equipment UE2), and a two-way interference channel between the two users. According to two-way coding, information to be sent is basically transmitted on a strong interference channel by taking a detour. Assume that a multi-antenna preprocessing/reception processing structure is available for a base station only. And, assume that a channel state in uplink is different from a channel state in downlink by premising frequency duplex division (FDD). Yet, in TDD structure, as a channel changes quickly, in case that an uplink channel status and a downlink channel status are different from each other, the present invention is applicable. Moreover, although a channel in uplink/downlink does not change quickly, as a service cell in uplink and a service cell in downlink are different from each other in TDD or FDD structure, in case that a gain of an uplink channel and a gain of a downlink channel are considerably different from each other, the present invention is applicable.

Based on the system model shown in FIG. 7, three kinds of transmissions via detour path are possible. First of all, according to Distributed Two-Way Coding (DTWC), a first base station receives channel informations from a first user equipment belonging to a first base station and a second user equipment belonging to a second base station and is able to transmit a signal for the first base station to the second user equipment in consideration of the channel informations. The signal transmitted to the second user equipment is transmitted to the second base station, and the signal transmitted to the second base station can be transmitted to the first user equipment. In particular, as the two-way coding can consider that a desired information makes a detour through an interference link, it is able to transmit information by enabling the information to take a detour like DTWC. Secondly, according to two-hop jointed two-way coding (2JTWC), unlike DTWC, detour two-way paths of two hops can be combined with each other. As an extension of 2JTWC, it is able to use three-hop jointed two-way coding (3JTWC).

The above-described transmission for detour path may be used independently or by a multi-mode transmission scheme including a detour path. In particular, an optimal transmission rate is found on a specific condition and a transmission scheme can be selected from a single hop transmission and a detour path transmission. For instance, in the system model shown in FIG. 7, when the first base station receives channel informations from the first user equipment belonging to the first bae station and the second user equipment belonging to the second base station and then transmits a signal for the first base station to at least one of the first user equipment and the second user equipment in consideration of the channel informations, on a specific condition, the signal for the first base station is transmitted to the second user equipment, the signal transmitted to the second user equipment is transmitted to the second base station, and the signal transmitted to the second base station can be transmitted to the first user equipment [DTWC].

Alternatively, when the first base station receives channel informations from the first user equipment belonging to the first bae station and the second user equipment belonging to the second base station and then transmits a signal for the first base station to at least one of the first user equipment and the second user equipment in consideration of the channel informations, on a specific condition, the signal for the first base station is transmitted to each of the first user equipment and the second user equipment, the signal transmitted to the first user equipment and the signal transmitted to the second user equipment are transmitted to the second base station, and the signal transmitted to the second base station can be transmitted to the first user equipment by being combined [2JTWC].

Alternatively, when the first base station receives channel informations from the first user equipment belonging to the first bae station and the second user equipment belonging to the second base station and then transmits a signal for the first base station to at least one of the first user equipment and the second user equipment in consideration of the channel informations, on a specific condition, the signal transmitted to the first user equipment and the signal transmitted to the second user equipment are transmitted to the first base station and the second base station. And, each of the first base station and the second base station combines the signals received from the respective user equipments together and is then able to transmit it to the first user equipment [3JTWC].

In this case, the specific condition may include at least one of: i) a case that SINR (signal to interference plus noise ratio) according to channel information is equal to or greater than a preset value; ii) a case that a channel between the first base station and the second user equipment, a channel between the second user equipment and the second base station and a channel between the second base station and the first user equipment are causal; iii) a case that a channel variation between the first user equipment and the first base station is equal to or greater than a preset value; iv) a case that mobility of the first user equipment is equal to or greater than a preset value; and v) a case that causality of a channel is not securable. A causal CSI means a CSI retained by a specific user at a specific timing point or a period from a past to a corresponding timing point in viewpoint of a specific user. A non-causal CSI means a CSI cannot be retained by a user at a corresponding timing point. For instance, if a channel does not change during three hops of DUD (UDU) like a block fading channel, all channels correspond to causal CSI. If a channel changes in three hops, $h_i^{[1]}$ and $g_i^{[1]}$ (where i=2) correspond to causal CSI in the first hop and the rest of channels correspond to non-causal CSI.

If the above condition is not met, a signal for the first base station may be transmitted in a single hop. An SINR threshold used for a single hop transmission can be set to be broadcasted to a user equipment in advance so that the user equipment can avoid providing unnecessary channel information feedback.

In order to make the detour path mentioned in the foregoing description, every base station can estimate an interference channel of another cell user in a manner of being informed of the corresponding interference channel by the corresponding user at a synchronized time. Alternatively, every UE can feed back channel information by assuming two-way coding. Assuming user's low fluidity and slot fading, CSI almost changed until a third hop from a first hop. All non-causal CSI can be obtained for all time without new estimation. A change of CSI can be updated by adaptive filtering.

Every UE feeds back channel information on the assumption of two-way coding, estimates a transmission rate expected by a base station for two-way coding and single hop transmission, and is then able to perform a transmission by selecting a scheme of a high transmission rate. In case that causality of a channel is not securable, it is expected that a single hop transmission may have better performance. This may be implemented in a manner as follows. First of all, a base station compares a channel fed back by a UE. Secondly, if a corresponding difference is equal to or greater than a predetermined threshold, the single hop transmission is used. Alternatively, if mobility of a user equipment is equal to or greater than a predetermined threshold based on GPS or the like, the user equipment may send a base station a signal indicating that the mobility is equal to or higher than a predetermined level. For example, '1' is sent if the mobility exceeds a predetermined speed. Otherwise, '0' is sent. In this case, the base station may use a single hop transmission if the mobility of the corresponding user equipment is equal to or higher than the predetermined level.

For instance, every base station may need CSS of 3 hops in the following for two-way coding. They are $W_1$, $W_2$, $F_1$, $F_2$, $P_1$ and $P_2$. Before determining whether to use 3JTWC, every $i^{th}$ base station measures a first hop long-term SNR and INR of a path to send through and fading channel configuration elements $g_i^{[1]}$ and $h_i^{[1]}$. Based on the measured non-causal CSI ($g_i^{[2]}$, $h_i^{[2]}$, $g_i^{[3]}$, $h_i^{[3]}$) of the second and third hops, a base station calculates a transmission rate $R_{ZF}$ of ZFBF and a transmission rate of 3JTWC $R_{twc}$ in advance. If $R_{ZF} > R_{twc}$, it is able to select ZFBF directly. Otherwise, i.e., if $R_{ZF} \not> R_{twc}$, it is able to select 3JTWC algorithm.

It is able to obtain CSI of a current UL (or DL) periodicity using CSI of UL (or DL) of a previous periodicity. If a previous CSI fails to match a non-causal CSI precisely due to high fluidity or fast fading, the JTWC algorithm is cancelled and it is able to perform a transmission using ZFBF (zero-forcing beamforming). When CSI tends not to change across three hops (UL-DL-UL or DL-UL-DL), JTWC is applicable to raise transmission rate performance in a low SNR area.

In the following description, each of the above-described DTWC, 2JTWX and 3JTWC is described in detail. The following description is basically based on the system model shown in FIG. 7. A reception signal $y_i^{[1]}$ of an $i^{th}$ user in a first hop in FIG. 7 is equal to Formula 12 in the following.

$$y_1^{[1]} = h_1^{\dagger[1]}w_1 s_1 + g_2^{H[1]}w_2 s_2 + n_1^{[1]},$$

$$y_2^{[1]} = h_2^{\dagger[1]}w_1 s_1 + g_2^{H[1]}w_2 s_2 + n_1^{[1]}, \quad \text{[Formula 12]}$$

In Formula 12, $h_i^{[1]} \in C^{N_t}$ and $g_i^{[1]} \in C^{N_t}$ indicate a channel of a path of a transmission-intended path of a first downlink hop from an $i^{th}$ base station and an interference channel, respectively. $W_i$, $S_i$ and $n_i^{[1]}:N(0,1)$ indicate a beam forming vector of the $i^{th}$ base station, a transmission-intended signal of an $i^{th}$ base station-user pair, and an independent and evenly-distributed complex Gaussian noise of an $i^{th}$ user, respectively. A subscript [t] indicates an $i^{th}$ hop. A reception signal $y_i^{[2]}$, which went through an uplink channel, of the $i^{th}$ base station is expressed as Formula 13 as follows.

$$y_1^{[2]} = F_1 h_1^{[2]} y_1^{[1]} + F_1 g_1^{[2]} y_2^{[1]} + F_1 n_1^{[2]},$$

$$y_2^{[2]} = F_2 h_2^{[2]} y_2^{[1]} + F_2 g_2^{[2]} y_1^{[1]} + F_2 n_2^{[2]}, \quad \text{[Formula 13]}$$

In Formula 13, $F_i$ indicates $N_t'N_t$ MIMO receiving filter of the $i^{th}$ base station and $n_i^{[2]}$ indicates an independent and evenly-distributed complex vector Gaussian noise of the $i^{th}$ base station. Finally, a reception signal $y_i^{[3]}$, which went through a third hop channel, of the $i^{th}$ user is expressed as Formula 14 as follows.

$$y_1^{[3]} = h_1^{\dagger[3]} P_1 y_1^{[2]} + g_2^{\dagger[3]} P_2 y_2^{[2]} + n_1^{[3]},$$

$$y_2^{[3]} = h_2^{\dagger[3]} P_2 y_2^{[2]} + g_1^{\dagger[3]} P_1 y_1^{[2]} + n_2^{[3]}, \quad \text{[Formula 14]}$$

$P_i$ means $N_t'N_t$ MIMO preprocessing matrix of the $i^{th}$ base station.

Distributive Two-Way Coding (DTWC)

Figure 8:
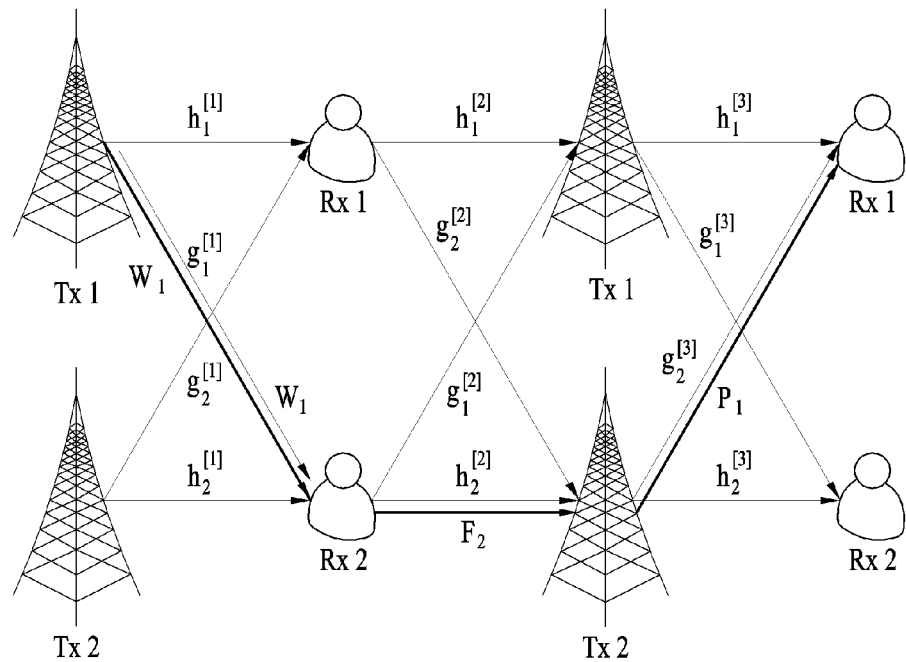

FIG. 8 shows DTWC. All received informations of a base station and a user are transmitted by being delayed in each hop. A first hop of a downlink channel uses an MRT (maximal-ratio transmission) beam forming that maximizes an interference channel in each base station. To this end, Rx 2 should feed back channel information to Tx 1. In doing so, channel interference channel information may be directly transmitted to a counterpart transmitter. Alternatively, after channel information has been fed back to a base station of its own, channel information may be shared through a backhaul between base stations. The MRT beam forming is expressed as Formula 15 in the following.

$$w_1^{[1]} = \frac{g_1^{[1]}}{\|g_1^{[1]}\|}, \quad w_2^{[1]} = \frac{g_2^{[1]}}{\|g_2^{[1]}\|}. \quad \text{[Formula 15]}$$

In a second hop of an uplink channel, each user should send an interference signal on a desired channel. In this case, a simple maximal-ratio combining (MRC) receiver can be defined as Formula 16 in the following.

[Formula 16]

$$F_1^{[2]} = \frac{h_1^{[2]}}{\|h_1^{[2]}\|}, \quad F_2^{[2]} = \frac{h_2^{[2]}}{\|h_2^{[2]}\|}. \quad (9)$$

A last hop of a downlink channel repeats the maximization of an interference link in the same manner of the first hop.

In case that information cannot be correctly transmitted on a transport channel due to a very strong interference channel, the information is transmitted in a manner of taking a detour of data to the interference channel and relaying it to an adjacent base station. The distributive two-way coding is characterized in applying two-way coding using a channel information of a current hop directly only without requiring channel information of a following hop. In this case, implementation of a transceiving filter is non-limited by MRT and MRC mentioned in the foregoing description. For instance, if channel information on a transport channel is additionally available for a first transmitter, ZF (zero-forcing) structure is usable instead of MRT. Likewise, if information of an interference channel is available for a receiver of a second hop, an interference rejection receiver is usable instead of MRC.

Two-Hop Jointed Two-Way Coding (2JTWC)

Figure 9:
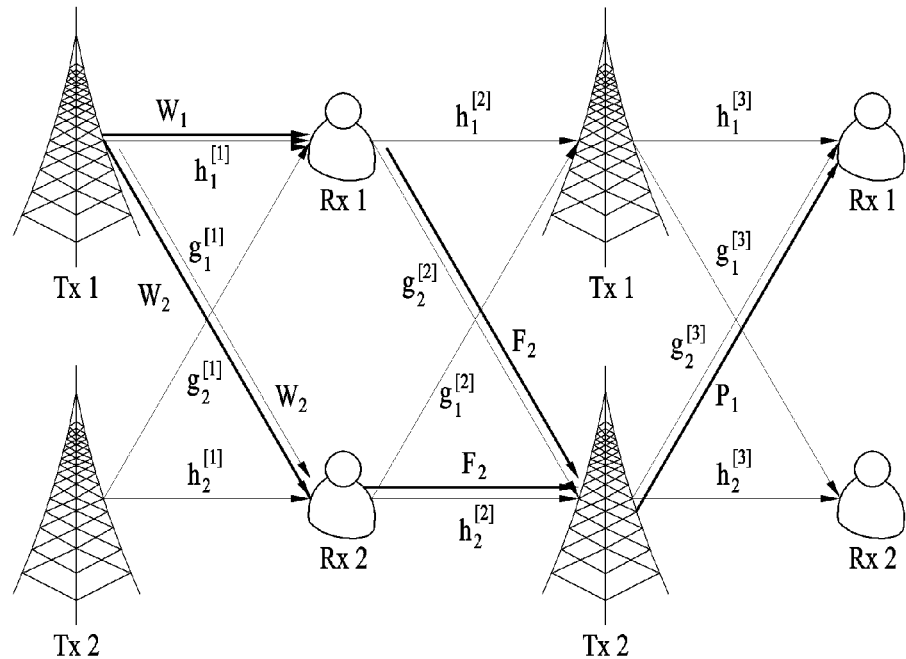

FIG. 9 shows one example of 2JTWC. According to this example, a pre-processor/receiver designed in consideration of each hop is not determined instantly but can be determined using an advance information of a partial channel of a future hop mandatorily. All received informations of a base station and a user are delivered through amplify-and-forward relaying. For the simplicity, noise pars are excluded from the following formulas.

For a first hop of a downlink channel, each base station transmits a signal using a beam forming vector $w_i^{[1]}$. A reception signal $y_i^{[1]}$ of an $i^{th}$ user in the first hop is expressed as Formula 17 in the following.

$$y_1^{[1]} = h_1^{\dagger[1]} w_1 s_1 + g_2^{\dagger[1]} w_2 s_2,$$

$$y_2^{[1]} = h_2^{\dagger[1]} w_2 s_2 + g_1^{\dagger[1]} w_1 s_1.$$  [Formula 17]

In a second hop of an uplink channel, each base station decodes information of all users using an MIMO receiver structure. A reception signal $y_i^{[2]}$, which went through the uplink channel, of an $i^{th}$ base station is expressed as Formula 18 and Formula 19 in the following.

$$y_1^{[2]} = F_1(h_1^{[2]} h_1^{\dagger[1]} + g_1^{[2]} g_1^{\dagger[1]}) w_1 s_1 + F_1(h_1^{[2]} g_2^{\dagger[1]} + g_1^{[2]} h_2^{\dagger[1]}) w_2 s_2$$  [Formula 18]

$$y_2^{[2]} = F_2(g_2^{[2]} h_1^{\dagger[1]} + h_2^{[2]} g_1^{\dagger[1]}) w_1 s_1 + F_2(g_2^{[2]} g_2^{\dagger[1]} + h_2^{[2]} h_2^{\dagger[1]}) w_2 s_2$$  [Formula 19]

Channel matrixes combined to simplify notations are denoted as follows.

$$h_1^{[2]} h_1^{\dagger[1]} + g_1^{[2]} g_1^{\dagger[1]} \triangleq H_{11},$$

$$h_1^{[2]} g_2^{\dagger[1]} + g_1^{[2]} h_2^{\dagger[1]} \triangleq H_{12},$$

$$g_2^{[2]} h_1^{\dagger[1]} + h_2^{[2]} g_1^{\dagger[1]} \triangleq H_{21},$$

$$g_2^{[2]} g_2^{\dagger[1]} + h_2^{[2]} h_2^{\dagger[1]} \triangleq H_{22}.$$

The $i^{th}$ base station has all side informations of $F_i$, $H_{ii}$, $w_i$ and an intended signal $s_i$. Hence, a first term of Formula 18 and a last term of Formula 19 can be eliminated as follows.

$$y_1^{[2]} = F_1 H_{12} w_2 s_2,$$  [Formula 20]

$$y_2^{[2]} = F_2 H_{21} w_1 s_1.$$  [Formula 21]

If Formula 20 and Formula 21 are substituted with a transmission signal of a third hop, a reception signal of the third hop is expressed as Formula 21].

$$y_1^{[3]} = g_2^{\dagger[3]} P_2 F_2 H_{21} w_1 s_1 + h_1^{\dagger[3]} P_1 F_1 H_{12} w_2 s_2,$$

$$y_2^{[3]} = h_2^{\dagger[3]} P_2 F_2 H_{21} w_1 s_1 + g_1^{\dagger[3]} P_1 F_1 H_{12} w_2 s_2,$$  [Formula 21]

In this case, $w_i$, $F_i$ and $P_i$ indicate a beam forming vector of a first hop, a receiving filter matrix of a second hop and a pre-processor of an $i^{th}$ base station of a third hop, respectively. According to this proposal, 1) $P_i$ is a null projection matrix for $h_i^{\dagger[3]}$, 2) $F_i = U_{ij}^\dagger$, 3) $w_i$ is a vector corresponding to a largest Eigen value of $V_{ji}^\dagger$. In this case, $i,j=1,2$ and $i \neq j$. Unit matrixes $U_{ij}$ and $V_{ij}$ are obtained by singular value decomposition (SVD) of a channel matrix $H_{ij} = U_{ij} \Sigma_{ij} V_{ij}^\dagger$.

The above-described transceiver implementing method just shows one embodiment, and the present invention is non-limited by the SVD scheme. For instance, an MMSE transceiver, an interference rejection transceiver, a block diagonalization transceiver and the like are applicable.

Compared to the scheme of DTWC, 2JTWC can combine signals distributed to a transport channel and an interference channel in a given channel environment instead of transmitting an information intended to be sent through an interference path. The beam forming vector $w_i$ of the first hop and the receiving filter $F_i$ of the second hop maximize a substantial channel $H_{ij}$ by gathering a signal to send and an interference signal, and the pre-processor $P_i$ of the third hop separates an unnecessary transmitted signal decisively. In particular, a signal is received through an intended path.

Three-Hop Jointed Two-Way Coding (3JTWC)

Figure 10:
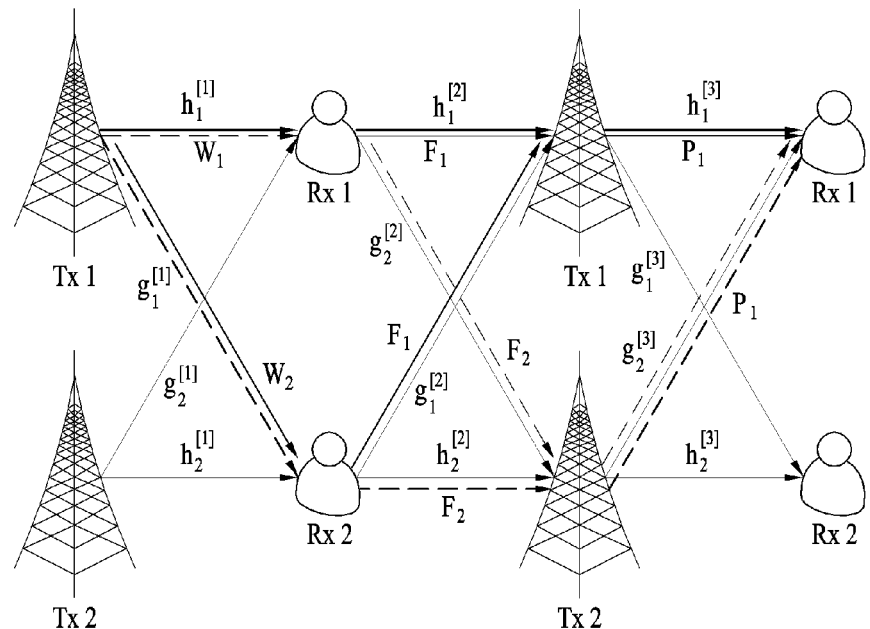

FIG. 10 shows one example of 3JTWC. Herein, in order to approach optimization of two-way coding, optimization is achieved in aspect of SINR. In this case, the optimization means the maximization of total SINR on the premise that each user has the same quality-of-service (QoS). The maximization of the total SINR can be expressed as Formula 22 in the following.

$$\operatorname*{argmax}_{\substack{P_1, F_1, w_1 \\ P_2, F_2, w_2}} \{SINR_1 + SINR_2\}$$  [Formula 22]

$SINR_1$ and $SINR_2$ in 3JTWC can be defined as Formula 23 in the following.

$$SINR_1 = \frac{\left|(h_1^{\dagger[3]} P_1 F_1 H_{11} + g_2^{\dagger[3]} P_2 F_2 H_{21}) w_1\right|^2}{\tilde{\sigma}_{n1}^2 + \left|(h_1^{\dagger[3]} P_1 F_1 H_{12} + g_2^{\dagger[3]} P_2 F_2 H_{22}) w_2\right|^2},$$  [Formula 23]

$$SINR_2 = \frac{\left|(h_2^{\dagger[3]} P_2 F_2 H_{22} + g_1^{\dagger[3]} P_1 F_1 H_{12}) w_2\right|^2}{\tilde{\sigma}_{n2}^2 + \left|(h_2^{\dagger[3]} P_2 F_2 H_{21} + g_1^{\dagger[3]} P_1 F_1 H_{11}) w_1\right|^2}.$$

A substantial noise $\tilde{\sigma}_{nk}^2$ $k \in \{1,2\}$ of a kth user and a reception signal of each hop are expressed as follows.

A reception signal $y_k^{[1]}$ of a $k^{th}$ user (k=1, 2) in a first hop is expressed as Formula 24 in the following.

$$y_1^{[1]} = h_1^{\dagger[1]} w_1 s_1 + g_2^{\dagger[1]} w_2 s_2 + n_1^{[1]},$$

$$y_2^{[1]} = h_2^{\dagger[1]} w_2 s_2 + g_1^{\dagger[1]} w_1 s_1 + n_2^{[1]}.$$  [Formula 24]

A reception signal $y_k^{[2]}$ of a $k^{th}$ base station (k=1, 2) in a contiguous second hop is expressed as Formula 25 in the following.

$$y_1^{[2]} = F_1 h_1^{[2]} y_1^{[1]} + F_1 g_1^{[2]} y_2^{[1]} + F_1 n_1^{[2]} =$$  [Formula 25]
$$\left(F_1 h_1^{[2]} h_1^{\dagger[1]} w_1 + F_1 g_1^{[2]} g_1^{\dagger[1]} w_1\right) s_1 +$$
$$\left(F_1 h_1^{[2]} g_2^{\dagger[1]} w_2 + F_1 g_1^{[2]} h_2^{\dagger[1]} w_2\right) s_2 +$$
$$F_1 h_1^{[2]} n_1^{[1]} + F_1 g_1^{[2]} n_2^{[1]} + F_1 n_1^{[2]},$$

$$y_2^{[2]} = F_2 h_2^{[2]} y_2^{[1]} + F_2 g_2^{[2]} y_1^{[1]} + F_2 n_2^{[2]} =$$
$$\left(F_2 h_2^{[2]} h_2^{\dagger[1]} w_2 + F_2 g_2^{[2]} g_2^{\dagger[1]} w_2\right) s_2 +$$
$$\left(F_2 h_2^{[2]} g_1^{\dagger[1]} w_1 + F_2 g_2^{[2]} h_1^{\dagger[1]} w_1\right) s_1 +$$
$$F_2 h_2^{[2]} n_2^{[1]} + F_2 g_2^{[2]} n_1^{[1]} + F_2 n_2^{[2]}.$$

Finally, a reception signal $y_k^{[3]}$ of the $k^{th}$ user (k=1, 2) in a third hop is expressed as Formula 26 in the following.

$$y_1^{[3]} = h_1^{\dagger[3]} P_1 y_1^{[2]} + g_2^{\dagger[3]} P_2 y_2^{[2]} + n_1^{[3]} =$$  [Formula 26]
$$\{h_1^{\dagger[3]} P_1 F_1 (h_1^{[2]} h_1^{\dagger[1]} + g_1^{[2]} g_1^{\dagger[1]}) +$$
$$g_2^{\dagger[3]} P_2 F_2 (h_2^{[2]} g_1^{\dagger[1]} + g_2^{[2]} h_1^{\dagger[1]})\} w_1 s_1 +$$
$$\{h_1^{\dagger[3]} P_1 F_1 (h_1^{[2]} g_2^{\dagger[1]} + g_1^{[2]} h_2^{\dagger[1]}) +$$
$$g_2^{\dagger[3]} P_2 F_2 (h_2^{[2]} h_2^{\dagger[1]} + g_2^{[2]} g_2^{\dagger[1]})\} w_2 s_2 +$$
$$(h_1^{\dagger[3]} P_1 F_1 h_1^{[2]} + g_2^{\dagger[3]} P_2 F_2 g_2^{[2]}) n_1^{[1]} +$$

-continued $$(h_1^{\dagger[3]}P_1F_1g_1^{[2]} + g_2^{\dagger[3]}P_2F_2h_2^{[2]})n_2^{[1]} +$$
$$h_1^{\dagger[3]}P_1F_1n_1^{[2]} + g_2^{\dagger[3]}P_2F_2n_2^{[2]} + n_1^{[3]}$$

$$y_2^{[3]} = h_2^{\dagger[3]}P_2y_2^{[2]} + g_1^{\dagger[3]}P_1y_1^{[2]} + n_2^{[3]} =$$
$$\{h_2^{\dagger[3]}P_2F_2(h_2^{[2]}h_2^{\dagger[1]} + g_2^{[2]}g_2^{\dagger[1]}) +$$
$$g_1^{\dagger[3]}P_1F_1(h_1^{[2]}g_2^{\dagger[1]} + g_1^{[2]}h_2^{\dagger[1]})\}w_2s_2 +$$
$$\{h_2^{\dagger[3]}P_2F_2(h_2^{[2]}g_1^{\dagger[1]} + g_2^{[2]}h_1^{\dagger[1]}) +$$
$$g_1^{\dagger[3]}P_1F_1(h_1^{[2]}h_1^{\dagger[1]} + g_1^{[2]}g_1^{\dagger[1]})\}w_1s_1 +$$
$$(h_2^{\dagger[3]}P_2F_2g_2^{[2]} + g_1^{\dagger[3]}P_1F_1h_1^{[2]})n_1^{[1]} +$$
$$(h_2^{\dagger[3]}P_2F_2h_2^{[2]} + g_1^{\dagger[3]}P_1F_1g_1^{[2]})n_2^{[1]} +$$
$$g_1^{\dagger[3]}P_1F_1n_1^{[2]} + h_2^{\dagger[3]}P_2F_2n_2^{[2]} + n_2^{[3]}$$

In 3JTWC, since all users transmit CSI feedback to a base station by wireless, an $i^{th}$ base station can obtain $h_i^{[1]}$ and $g_i^{[1]}$ for i=1, 2. As each base station estimates CSI through pilot signals of all users, the $i^{th}$ base station can obtain $h_i^{[1]}$, $g_i^{[1]}$, $h_i^{[2]}$ and $g_j^{[2]}$ for $i^1j$ and i,j=1, 2. As each base station shares CSI by transmitting CSI only through wire/wireless backhaul right after channel estimation, all base stations can obtain $h_i^{[1]}$, $g_i^{[1]}$, $h_i^{[2]}$ and $g_i^{[2]}$ for i=1, 2. By repeating the above process, the non-causal CSI problem of 3JTWC can be solved despite that CSI changes slightly. If a system selects 3JTWC, there are CSIs available for the $i^{th}$ base station: 1) causal CSI $h_i^{[1]}$, $g_i^{[1]}$, $h_i^{[3]}$, and $g_i^{[3]}$; and 2) for $i^1j$, i,j=1,2, non-causal CSI $h_j^{-[1]}$, $g_j^{-[1]}$, $h_j^{-[2]}g_j^{-[2]}$, $h_j^{-[3]}$, $g_j^{-[3]}$, $h_i^{-[2]}$, and $g_i^{-[2]}$. Based on 4 causal CSIs and 8 non-causal CSIs, it is able to find $w_i$, $F_i$ and $P_i$ for $i^1j$, i, j=1,2.

Update of the non-causal CSI can be performed in a following manner. First of all, if the 3JTWC algorithm begins, 8 non-causal CISs actually have slight change e compared to that of current CSI. The $i^{th}$ base station shares a quantity of e for $(h_i^{[1]}-h_i^{-[1]})$ and $(g_i^{[1]}-g_i^{-[1]})$ after CSI feedback from a user to a base station. If so, all CSIs of the first hop are updated. For such reasons, $w_i$ for i=1, 2 is made using 4 causal CSIs and 8 non-Causal CSIs of the first hop. The CSI of the second hop, which is newly updated in the second hop, can be used in determining $F_i$ for i=1, 2. Eventually, $F_i$ is made using 8 causal CSIs and 4 non-causal CSIs of the first and second hops. Finally, because of the CSI feedback made by a user and the update of the channel change e, all CSIs become causal and the $P_i$ is perfectly made by 12 causal CSIs. If a channel is a block fading that does not change in three hops, all CSIs become causal and can be then applied by finding $w_i$, $F_i$ and $P_i$ in the first hop.

Types of channel feedback required for each of the above-mentioned transmission schemes are shown in Table 1.

TABLE 1

| Necessary channel feedback (in viewpoint of User 1) | |
|---|---|
| DTWC | $g_1^{[1]}$, $h_2^{[2]}$, $g_2^{[3]}$ |
| 2JTWC | $h_1^{[1]}$, $g_1^{[1]}$, $h_2^{[2]}$, $g_2^{[2]}$, $g_2^{[3]}$ |
| 3JTWC | non-static channel environment (non-causal CSI update information included) | static channel environment |
| | $h_1^{[1]}$, $g_1^{[1]}$, $h_2^{[1]}$, $g_2^{[1]}$, $h_1^{[2]}$, $g_1^{[2]}$, $h_2^{[2]}$, $g_2^{[2]}$, $h_1^{[3]}$, $g_1^{[3]}$, $h_2^{[3]}$, $g_2^{[3]}$ | $h_1^{[1]}$, $g_1^{[1]}$, $h_2^{[1]}$, $g_2^{[1]}$, $h_1^{[2]}$, $g_1^{[2]}$, $h_2^{[2]}$, $g_2^{[2]}$ |

Moreover, except 3JTWC in the above-mentioned description, rates $\alpha_j^{[1]}$, $\alpha_j^{[3]}$ of first and third hops of two users (j=1, 2), i.e., a forward transport channel to a forward interference channel gain are sufficiently large and a rate $\alpha_j^{[2]}$ of a second hop of the two users (j=1, 2), i.e., a backward transport channel to a backward interference channel should be sufficiently small like the following formula $$\left(\alpha_j^{[i]} = \frac{h_j^{[i]}}{g_j^{[i]}} \gg 1\right)$$

as well. This is applicable to a reverse case, i.e., a case that a gain of forward interference and transport channels is large and that a rate of backward interference and transport channels is large $$\left(\alpha_j^{[i]} = \frac{h_j^{[i]}}{g_j^{[i]}} \gg 1\right).$$

In case of 3JTWC, a gain is obtained by applying the above description irrespective of a gain ratio of a forward channel and a gain ratio of a backward channel. In this case, SNR means a signal to noise ratio in a random hop, while INR means an interference signal to noise ratio.

The above description is broadly applicable to an interference-limited device-to-device (D2D) network and the like as well as to a cellular network. If $R_{ZF} £ R_{twc}$ is met for a weak interference environment, 3JTWC is available to acquire a performance gain in a low SNR area.

Device Configuration According to Embodiment of The Present Invention

Figure 11:
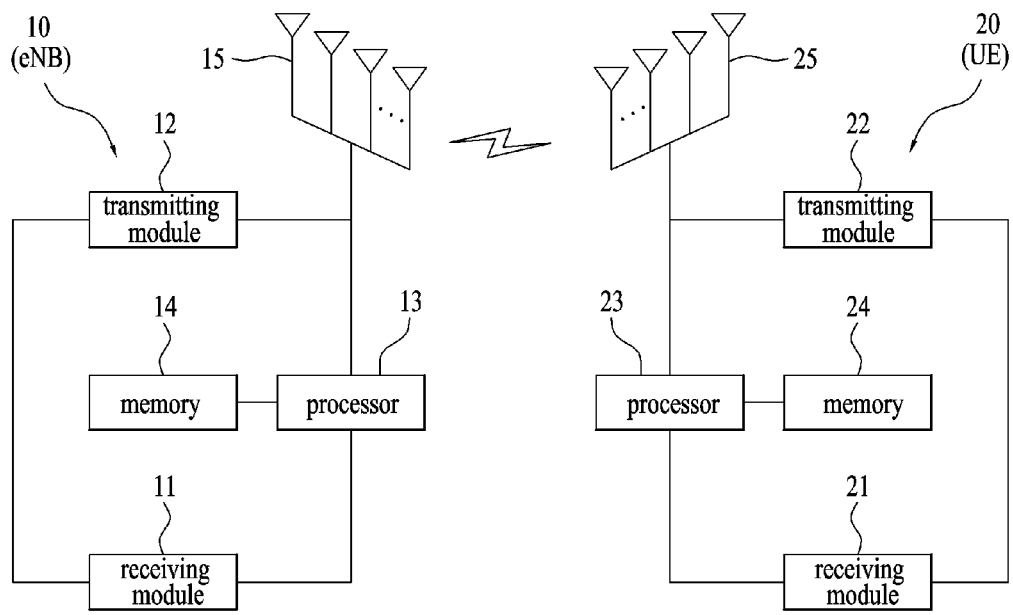
FIG. 11 is a diagram to show configurations of a transceiving device.

FIG. 11 is a diagram for configurations of a transmitting point device and a user equipment device according to an embodiment type of the present invention.

Referring to FIG. 11, a transmitting point device 10 according to the present invention may include a receiving module 11, a transmitting module 12, a processor 13, a memory 14 and a plurality of antennas 15. In this case, a plurality of the antennas 15 may mean a transmitting point device that supports MIMO transmission and reception. The receiving module 11 can receive various signals, data and informations in uplink from a user equipment. The transmitting module 12 can transmit various signals, data and informations in downlink to the user equipment. The processor 13 can control overall operations of the transmitting point device 10.

The processor 13 of the transmitting point device 10 according to one embodiment of the present invention can process items required for the respective embodiments mentioned in the foregoing description.

The processor 13 of the transmitting point device 10 performs a function of operating information received by the transmitting point device 10, information to be externally transmitted and the like. The memory 14 may store the operation-processed information and the like for prescribed duration and may be substituted with such a component as a buffer (not shown in the drawing) and the like.

Further referring to FIG. 11, a user equipment device 20 according to the present invention may include a receiving module 21, a transmitting module 22, a processor 23, a memory 24 and a plurality of antennas 25. In this case, a plurality of the antennas 25 may mean a user equipment device that supports MIMO transmission and reception. The receiving module 21 can receive various signals, data and informations in downlink from a base station. The transmitting module 22 can transmit various signals, data and informations in uplink to the base station. And, the processor 23 can control overall operations of the user equipment device 20.

The processor 23 of the user equipment device 20 according to one embodiment of the present invention can process items required for the respective embodiments mentioned in the foregoing description.

The processor 23 of the user equipment device 20 performs a function of operating information received by the user equipment device 20, information to be externally transmitted and the like. The memory 24 may store the operated information and the like for prescribed duration and may be substituted with such a component as a buffer (not shown in the drawing) and the like.

The detailed configurations of the transmitting point device and the user equipment device mentioned in the above description may be implemented in a manner that the matters of the various embodiments of the present invention mentioned in the foregoing description are independently applicable or that at least two of the various embodiments of the present invention are simultaneously applicable. And, duplicate or redundant contents may be omitted for clarity.

Moreover, in the description with reference to FIG. 11, the description of the transmitting point device 10 may be identically applicable to a relay device as a DL or UL transmitting entity and the description of the user equipment device 20 may be identically applicable to a relay device as a DL or UL transmitting entity.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of mobile communication systems.

What is claimed is:

1. A method of transmitting, by a first base station, a signal in a wireless communication system, the method comprising the steps of:
   receiving channel information from a first user equipment belonging to the first base station and a second user equipment belonging to a second base station; and
   transmitting the signal for the first base station to at least one of the first user equipment and the second user equipment in consideration of the channel information,
   wherein if SINR (signal to interference plus noise ratio) according to the channel information is equal to or greater than a preset value, the signal for the first base station is transmitted to the second user equipment.

2. The method of claim 1, wherein the signal transmitted to the second user equipment is transmitted to the second base station and wherein the signal transmitted to the second base station is transmitted to the first user equipment.

3. The method of claim 2, wherein a channel between the first base station and the second user equipment, a channel between the second user equipment and the second base station and a channel between the second base station and the first user equipment are causal.

4. The method of claim 1, wherein if a channel variation between the first user equipment and the first base station is equal to or greater than a preset value, the signal for the first base station is transmitted to the second user equipment.

5. The method of claim 1, wherein if mobility of the first user equipment is equal to or greater than a preset value, the signal for the first base station is transmitted to the second user equipment.

6. The method of claim 1, wherein the channel information is created in consideration of two-way coding.

7. The method of claim 1, wherein if the SINK according to the channel information is equal to or greater than the preset value, the signal for the first base station is transmitted to each of the first user equipment and the second user equipment.

8. The method of claim 7, wherein the signal transmitted to the first user equipment and the signal transmitted to the second user equipment are transmitted to the second base station and wherein the signal transmitted to the second base station is transmitted to the first user equipment.

9. The method of claim 8, wherein the signal transmitted to the first user equipment and the signal transmitted to the second user equipment are combined in the second base station.

10. The method of claim 1, wherein the signal transmitted to the first user equipment and the signal transmitted to the second user equipment are transmitted to the first base station and the second base station, respectively and wherein each of the first base station and the second base station combines the signals received from the respective user equipments and then transmits the combined signal to the first user equipment.

11. The method of claim 1, wherein if the SINR according to the channel information is smaller than the preset value, the signal for the first base station is transmitted in a single hop.

12. A first base station configured to transmit a signal in a wireless communication system, comprising:
 a radio frequency (RF) unit; and
 a processor configured to control the RF unit,
 wherein the processor is configured to receive channel information from a first user equipment belonging to the first base station and a second user equipment belonging to a second base station, and transmit the signal for the first base station to at least one of the first user equipment and the second user equipment in consideration of the channel information,
 wherein if SINR (signal to interference plus noise ratio) according to the channel information is equal to or greater than a preset value, the signal for the first base station is transmitted to the second user equipment.

* * * * *